US007579428B2

(12) United States Patent  
Jernigan

(10) Patent No.: US 7,579,428 B2
(45) Date of Patent: Aug. 25, 2009

(54) PROCESS FOR PREPARATION OF POLYESTERS WITHOUT SOLID STATE POLYMERIZATION

(75) Inventor: Mary Therese Jernigan, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/890,949

(22) Filed: Aug. 8, 2007

(65) Prior Publication Data

US 2008/0051530 A1  Feb. 28, 2008

Related U.S. Application Data

(60) Provisional application No. 60/838,057, filed on Aug. 16, 2006.

(51) Int. Cl.
 *C08G 63/02* (2006.01)
(52) U.S. Cl. ........................ 528/272; 528/271; 528/275; 528/279; 528/285; 528/287; 528/308.1; 526/86
(58) Field of Classification Search ................ 528/272, 528/275, 285, 48, 271, 279, 287, 308.1; 526/93, 526/86
See application file for complete search history.

(56) References Cited

U.S. PATENT DOCUMENTS 3,647,362 A * 3/1972 Head et al. .................... 423/92
4,034,019 A * 7/1977 Habermeier ................ 528/289
4,064,112 A * 12/1977 Rothe et al. ................ 528/272
5,573,820 A    11/1996 Harazoe et al.
5,681,918 A * 10/1997 Adams et al. ............... 528/279
5,750,635 A    5/1998 Brink et al.
5,886,133 A    3/1999 Hilbert et al.
6,022,603 A    2/2000 Umeda et al.
6,590,044 B2   7/2003 Suzuki et al.
2001/0017429 A1 8/2001 Takahashi et al.
2002/0128427 A1 9/2002 Schaaf et al.

FOREIGN PATENT DOCUMENTS

EP     1 188 783      3/2002
JP     2002088586     3/2002
JP     200297353      4/2002
WO     WO 2006/138031 12/2006

OTHER PUBLICATIONS

Fred W. Billmeyer, Jr., Method for Estimating Intrinsic Viscosity, Journal of Polymer Science, 1949, pp. 83-86, 4, E.I. du Pont de Nemours & Co., Arlington, New Jersey.
PCT International Search Report for PCT/US2007/018115 dated Dec. 28, 2007.

* cited by examiner

*Primary Examiner*—Irina S Zemel
*Assistant Examiner*—Frances Tischler
(74) *Attorney, Agent, or Firm*—Michael K. Carrier; Bernard J. Graves, Jr.

(57) ABSTRACT

Polyesters prepared using germanium catalyst in the finishing stage at temperatures less than 285° C. exhibit low loss of Ge catalyst and excellent low acetaldehyde generating characteristics.

36 Claims, No Drawings

PROCESS FOR PREPARATION OF POLYESTERS WITHOUT SOLID STATE POLYMERIZATION

This application claims priority to U.S. Provisional Application No. 60/838,057 filed Aug. 16, 2006, fully incorporated herein by reference.

FIELD OF THE INVENTION

The present invention is directed to the preparation of polyesters having repeating ethylene arylate units, such as polyethylene terephthalate and polyethylene naphthalate, and which have a high enough molecular weight to be useable without solid state polymerization.

The polycondensation of the polyesters is performed with a germanium catalyst at low temperatures, and the polyester products exhibit low acetaldehyde generation.

BACKGROUND OF THE INVENTION

Polyesters such as polyethylene terphthalate (PET), polyethylenenaphthalate (PEN), and similar polymers and copolymers have become staple commodities whose manufacture is well known and mature. Typical PET polymer preparation, for example, includes an uncatalyzed esterification of ethylene glycol with terephthalic acid, followed by increasing degrees of polycondensation. The polycondensation is catalyzed, and the last portion of this polycondensation is termed by some as "high polymerizing," and by others as "finishing," the term we will use herein. The finishing stage involves the highest temperature, usually 270° C. to 300° C., and the lowest pressure. The polymer obtained is extruded into water to form amorphous pellets, which are then subjected to crystallization. The polyester polymer product generally has a molecular weight which is too low for many applications, such as beverage bottles. The molecular weight, as reflected by the polymer's intrinsic viscosity, is generally in the range of 0.40 dL/g to about 0.67 dL/g. The polyester also contains measurable amounts of acetaldehyde generated during polymerization, as well as acetaldehyde precursors which may liberate acetaldehyde during later melt processing, such as the injection molding of bottle preforms.

The polyester pellets obtained from the finisher are thus subjected to solid state polymerization at a temperature below the melting point, and preferably in the range of 180° C. to 220° C., in a vacuum or a stream of inert gas. "Solid stating" has two principle advantages. First, it significantly increases the molecular weight, for example to an intrinsic viscosity in the range of 0.7 dL/g to 1.1 dL/g; and second it removes acetaldehyde from the polymer. However, these advantages are not obtained without significant cost: solid state polymerization is both energy and time intensive. Solid state polymerization also creates within pellets a large core to surface molecular weight gradient, which results in significant intrinsic viscosity loss upon melting the pellets. Eliminating solid state polymerization would be of great economic benefit.

Choice of polycondensation catalyst is important in polyester production, and many catalyst systems have been proposed. Titanium catalysts are the most efficient, and offer high polycondensation rates at low catalyst levels. However titanium catalyzed PET generally has both a high level of acetaldehyde as well as increased acetaldehyde generation during later melt processing. Relatively small amounts of acetaldehyde in beverage bottles can impart an off-flavor to the contents, and thus minimum acetaldehyde generation is quite important. Titanium catalysts also impart a yellow cast to the polyester.

Antimony catalysts have become the catalyst of choice, even though considerably less active than titanium. Phosphorus compounds are often added to improve moisture sensitive haze and thermal stability. If phosphorus stabilizers are not added, acetaldehyde generation rate upon melting the PET may be a concern, depending on the melt-phase conditions used. The AA generated upon melting is especially a concern when the polyester is manufactured exclusively in the melt-phase, that is, with no solid-stating. As disclosed in U.S. Pat. Nos. 5,750,635 and 5,886,133, the addition of phosphorous compounds can form precipitates which impact the clarity of the polyester. Some of the antimony catalyst is reduced to the metal under polymerization conditions. This results in dark PET, while brightness is valued in the industry.

Germanium catalysts have been proposed, but have not been entirely successful. For example, in U.S. Pat. No. 6,022,603, germanium dioxide is used in conjunction with compounds of cobalt, manganese, and magnesium, plus a phosphate stabilizer. The germanium catalyst is added after the phosphorus compound has been added to the melt, and after the intrinsic viscosity has reached 0.3 dL/g. However, the '603 patent emphasizes that in practical processes, intrinsic viscosity can only reach 0.50 to 0.67 during the finishing stage, and thus the polymer must be subjected to solid state polymerization to obtain useful products. A similar process, also involving solid state polymerization to a viscosity of 0.7 to 0.9 is disclosed in JP 2002 097353A. However, in the latter reference, the polyesters produced thereby had crystallization problems, and it was found to be necessary to add polytrimethylene terephthalate to induce crystallization, thus increasing the cost and complexity of the process.

In U.S. Pat. No. 6,590,044, antimony or germanium are disclosed in the alternative as polycondensation catalysts for PET/PEN copolymers. The polycondensation temperature is described as high and is followed by solid state polymerization. As prepared, prior to solid stating, intrinsic viscosity was 0.56 to 0.61 when germanium was employed as a catalyst.

An additional problem which is somewhat unique to germanium catalysis is the volatility of germanium compounds. Thus, at the high temperature and high vacuum of the prior art finishing processes, significant loss of germanium occurs. Since germanium is far more expensive than antimony, this loss is economically very disadvantageous. This expense, coupled with the need to solid state polymerize, has limited the use of germanium catalysts.

SUMMARY OF THE INVENTION

It has now been discovered that polyesters derived from ethylene glycol may be finished with a germanium catalyst to intrinsic viscosities greater than 0.72 dL/g, without requiring solid state polymerization, with reduced loss of germanium catalyst, or an improved acetaldehyde generation rate, or both. Such polyesters can be produced in a melt phase polycondensation by foregoing high temperatures during a substantial part of polycondensation in the finishing zone, and enhanced improvements can be observed by also lowering the pressure within the finishing zone. Most surprisingly, neither phosphorous stabilizers nor crystallization promoters need be added.

DETAILED DESCRIPTION OF THE INVENTION

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles.

References to a composition or solution containing "an" ingredient or "a" polymer is intended to include other ingredients or other polymers, respectively, in addition to the one named.

By "comprising" or "containing" or "having" is meant that at least the named compound, element, particle, or method step etc. must be present in the composition, solution or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" means that each listed ingredient is present in the composition or solution, and does not imply that any ingredient in the composition or solution is unbound or unreacted. The composition may be solid or liquid. The stated ingredients in the composition may be bound, unbound, reacted, unreacted, and unless otherwise specified, in any oxidation state.

As used herein, the term "metal" or "germanium" is an atom and does not imply any oxidation state or its chemical state. The germanium metal may be in any chemical state as a salt or chelate or complex or elemental, and in any oxidation state, unless otherwise expressly stated as having a particular oxidation state. The word "elemental," however, means a zero oxidation state.

Germanium compounds of the invention are catalytically active. To determine, if desired, whether an germanium compound is catalytically active by measuring whether or not the reaction rate is increased or the It.V. is increased by at least 0.1 dL/g if measured from a starting point of 0.2 to 0.4 dL/g and after 1 hour at 280° C. and 0.8 mm Hg with adequate agitation or after 1 hour at any desired set of operating conditions, and using the concentration desired for actual operations. Preferably, the germanium compound chosen will have sufficient catalytic activity such that the reaction rate is increased or the It.V. is increased by at least 0.2 dL/g, if measured from a starting point of 0.2 to 0.4 dL/g after 1 hour at 280° C. and 0.8 mm Hg with adequate agitation or after 1 hour at any desired set of operating conditions, using the concentration desired for actual operations.

The reported amount of a metal or germanium (e.g. ppm) is based on the amount of the atom present in the solution, polymer, or article and not the amount of the compound or salt, unless expressly stated as the amount of the compound or salt.

By a "polyester polymer" is meant a thermoplastic polyester polymer having repeating alkylene arylate units. The polyester thermoplastic polymers of the invention are distinguishable from liquid crystal polymers and thermosetting polymers in that thermoplastic polymers have no appreciable ordered structure while in the liquid (melt) phase and can be remelted and reshaped into a molded article. Liquid crystal polymers and thermosetting polymers are unsuitable for the intended applications such as packaging or stretching in a mold to make a container.

The polyester polymer may be prepared by direct esterification methods or transesterification (ester exchange processes). Direct esterification is the preferred method.

The polyester polymer is desirably a random polymer such that the monomer units in the polymer chain are randomly arranged rather than arranged in a block fashion. The polyester polymer contains repeating alkylene arylate units, such as alkylene terephthalate or alkylene naphthalate repeat units in the polymer chain. More specific examples of these repeating units include ethylene terephthalate, ethylene naphthalate, and trimethylene terephthalate.

More preferred are polyester polymers which comprise:
(i) a carboxylic acid component comprising at least 80 mole % of the residues of terephthalic acid, derivatives of terephthalic acid, naphthalene-2,6-dicarboxylic acid, derivatives of naphthalene-2,6-dicarboxylic acid, or mixtures thereof, and
(ii) a hydroxyl component comprising at least 60 mole %, or at least 80 mole % of the residues of ethylene glycol, based on 100 mole percent of carboxylic acid component residues and 100 mole percent of hydroxyl component residues in the polyester polymer.

Typically, polyesters such as those containing repeating ethylene terephthalate units are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds, which enter the process containing carboxylic acid group(s) or derivative(s) thereof and which are reacted into the product, add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds, which enter the process containing hydroxyl group(s) or derivatives thereof and which become part of said polyester product(s), add up to 100. The "residues" of compound(s) containing hydroxyl functionalities or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In another preferred embodiment, the polyester polymer comprises:
(a) a carboxylic acid component comprising at least 90 mole %, or at least 92 mole %, or at least 96 mole % of the residues of terephthalic acid, derivatives of terephthalic acid, naphthalene-2,6-dicarboxylic acid, derivatives of naphthalene-2,6-dicarboxylic acid, or mixtures thereof, more preferably terephthalic acid or derivatives of terephthalic acid, and
(b) a hydroxyl component comprising at least 90 mole %, or at least 92 mole %, or at least 96 mole % of the residues of ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivatives of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

Modifiers can be present in amount of up to 40 mole %, or up to 20 mole %, or up to 10 mole %, or up to 8 mole %, or up to 4 mole %, based on the total moles of their respective component in the polymer. Mono, tri and higher functional modifiers are preferably present in amounts of only up to about 8 mole %, or up to 4 mole %.

In addition to a diacid component of terephthalic acid, derivatives of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the present polyester may include additional modifier polyhydroxyls, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may preferably contain such comonomers as isophthalic acid, naphthalane dicarboxylic acid, 1,4-cyclohexanedimethanol, and diethylene glycol.

The polyester composition may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

In one embodiment, the composition contains less than 60 wt %, or less than 40 wt %, or less than 20 wt. %, or less than 10 wt. %, or less than 5 wt. %, or no post consumer recycle polyester polymer ("PCR") present in the composition. In another embodiment, the composition contains PCR in an amount of greater than zero and up to 60 wt. %, or up to 40 wt. %, or up to 20 wt %, or up to 10 wt. %.

The melt phase process employs an esterification or ester exchange zone and a polycondensation zone. Glycol and acid are first esterified, most often with an excess of glycol, to prepare low molecular weight esters and oligomers in an esterification zone, typically having an average DP based on the number average molecular weight ranging from 2 to 20, or 2 to 10, or 2 to 5. This reaction is often uncatalyzed in a direct esterification process. Following completion of esterification, typically to at least 80% conversion, or at least 90% conversion, the monomer mixture is removed from the esterification zone and fed to the polycondensation zone. Polycondensation is typified by commencing the application of vacuum, and/or the predominance of removing the alkylene glycol to build up molecular weight, such as ethylene glycol. In some processes, polycondensation may be conceptually divided into numerous substages, such as "prepolymerization," and "finishing," but the terms used in the industry are not consistent. In most processes, polycondensation takes place in a plurality of reactors, or in reactors containing a plurality of reaction zones. As the polymer melt subjected to polycondensation passes on to subsequent reactors and/or reaction zones, the temperature and amount of vacuum applied generally increases to drive the polycondensation towards completion.

The polycondensation process has a finishing reactor. What is meant by a finishing reactor is the final reactor in the polycondensation process for increasing the molecular weight of the polymer in the melt before solidification. In the finishing reactor, the temperature in conventional processes is generally between 290° C. and 305° C. In the present invention, however, the temperature in the finishing reactor is maintained at or below 275° C. In conventional processing, the polymer intrinsic viscosity at the end of the finishing stage is usually from 0.45 dL/g to 0.65 dL/g. In the subject invention process, however, the intrinsic viscosity of the polyester polymer obtained from the melt phase polymerization process is 0.72 dL/g or more. The intrinsic viscosity can be measured either on the particles, amorphous or crystallized, obtained after a cutter fed by the polymer melt exiting the finisher reactor without subjecting the particle to any processes which further increase their molecular weight, or by taking a sample from the discharge of the finisher reactor.

The polyester polymer melt is polycondensed in the finisher reactor/zone in the presence of at least 20 ppm, or at least 30 ppm, or at least 50 ppm germanium catalyst (added prior to, at, or in the finisher reactor but preferably after 90% conversion during esterification is obtained or after an esterification zone and before the finisher or final polycondensation reactor), calculated as germanium atoms relative to the total weight of the ingredients introduced into the polycondensation zone. There is no particular upper limit, but the amount typically would not exceed 250 ppm, or 200 ppm, or 175 ppm, germanium catalyst The amount of geranium present in the polymer may be significantly less if a post finisher process for recovering germanium is conducted at less than atmospheric pressure. In the finished polymer as described below, the amount of Ge present in the polyester polymer particles can range from at least 5 ppm, or at least 10 ppm, or at least 15 ppm, or at least 20 ppm, or at least 25 ppm, or at least 30 ppm, or at least 35 ppm, or at least 40 ppm, or at least 50 ppm, based on the weight of the polyester. There is no particular upper limit, but the amount typically does not exceed 250 ppm, or 200 ppm, or 175 ppm, or 100 ppm, or 75 ppm, based on the weight of the polyester.

Any suitable germanium compound may be used as the catalyst. However, germanium dioxide, such as amorphous germanium dioxide to reduce solubility issues, and simple germanium compounds such as germanium alkoxides and carboxylates are preferred. Examples of the latter two types of germanium compounds are germanium ethoxide and germanium acetate. Germanium glycolates and similar compounds may also be used. The germanium must be present in the finisher, and desirably present in a prepolymerization zone and a finishing zone. The germanium catalyst should be added, for example, after the intrinsic viscosity of the polymer reaches 0.2 dL/g. However, it may also be added prior to the or near the start of the polycondensation zone, and this mode of addition is preferred, particularly as the polycondensation rate will be much faster in the presence of germanium catalyst, and as the prefinishing stages operate at lower temperatures and higher pressure (lower vacuum). For example, germanium catalyst can be added between the end of the esterification zone and the start of the polycondensation zone. A single addition or multiple additions may be employed.

Increasing the reaction temperature in the finishing zone/reactor from 270° C. to 300° C. increases the amount of AA generated when the solid polyester particles are melted. Increasing the pressure from 0.2 torr to 2 torr also increases the amount of AA generated when the particles are melted.

Surprisingly, increasing the germanium level from 75 to 225 ppm does not impact the AA generation rate when the particles are melted. Germanium does not appear to be a good catalyst for degradation reactions. Increasing the germanium level from 75 to 225 ppm increases the polycondensation rate. In manufacturing, it is useful to adjust germanium levels to increase polycondensation rate without increasing the AA generation rate when solid particles are melted.

It is desirable that the polyesters of the invention are made in a finishing zone, and more preferably in the polycondensation zone, in the presence of a germanium catalyst and the temperature setting in the finishing zone, or the polycondensation zone, is 285° C. or less, or 280° C. or less and especially 275° C. or less, or 273° C. or less, or 270° C. or less. In another embodiment, the temperature in each case is 250° C. or more, or 260° C. or more. As used herein, a temperature or heating to a temperature or at a temperature not to exceed or less than means the temperature setting and not the actual temperature of the polymer melt in the polycondensation zone. In another embodiment, each of the temperatures stated above in this paragraph are the actual polymer temperatures when expressed as the actual polymer temperature.

As the polyester manufacturing temperatures, and in particular the finishing zone temperatures, increase in the presence of germanium catalyst, the percentage of germanium loss also tends to increase. As the level of germanium targeted increases, the percentage of germanium loss tends to decrease. The percentage of germanium loss is calculated by subtracting the amount of germanium measured by x-ray diffraction from the amount of germanium added, dividing the difference by the amount of germanium added, and multiplying the quotient by 100. The germanium amounts are calculated as the metal relative to the weight of the polyester. The process is more economically attractive when germanium compounds are recovered and preferably recycled.

It would not depart from the spirit of the invention to allow brief temperature excursions which are higher than 285° C. or any of the above stated temperatures before the It.V reaches 0.72 dL/g. It is desirable in a preferred embodiment that the applied temperature does not exceed 285° C., or does not exceed any of the mentioned temperature ranges (e.g. 280, 275, 273, 270) at least 90%, or at least 95%, or at least 98% of the residence time in the finisher reactor (also known as the last or final polycondensation reactor), or at least any one of these values of the polycondensation time, up to the point where the It.V. reaches 0.72 dL/g. The polycondensation time and the polycondensation zone begins when the oligomer mix obtained from esterification is introduced into a zone where the pressure is reduced below atmospheric to promote molecular weight build up by splitting off ethylene glycol. The finisher zone and residence time in the finisher reactor is measured at the point where polymer melt is fed to the last melt phase reactor used to manufacture the virgin polyester polymer.

The vacuum applied in the finishing zone/reactor is desirably low to obtain a polymer having both low loss of Ge and low AA generation rates. The polycondensation reaction in the finishing reactor is conducted at a pressure of 4 torr or less, or 3 torr or less, or 2 torr or less, or 1 torr or less, or 0.8 torr or less, or 0.5 torr or less, or 0.3 torr or less, or 0.2 torr or less. The pressure is desirably at least 0.1 torr in each case. While it is possible to obtain a polyester having high It.V. with low Ge loss and low AA generation rates at 275° C. or less, in a preferred embodiment, best results are obtained when the pressure in the finishing reactor is 1 torr or less, or 0.5 torr or less, or 0.3 torr or less, or 0.2 torr or less, and more preferably at less than 0.5 torr, or 0.3 torr or less, or 0.2 torr or less.

It is possible within a separate embodiment that once an It.V. of 0.72 dL/g has been reached at a temperature of 275° C. or less, a catalyst-removal post-finishing process can be applied by subjecting the polymer melt to a temperature higher than 275° C., such as 280° C.-305° C., generally for a relatively brief period, to lower the germanium catalyst content in the polyester to 40% or less of the initially charged amount. Removal of germanium catalyst by post-finishing (after the finisher reactor) in this manner may be accomplished by rerouting volatiles from the reactor so that germanium may be recovered and preferably recycled. The germanium recovered at this point will be much more concentrated than volatiles removed at earlier points in polycondensation, since the amount of water and glycol which will volatilize once the polymer has reached a viscosity of 0.72 dL/g is quite minimal. Since catalyst residues of any type are thought to increase acetaldehyde generation during later processing, removing catalyst in this manner may lower acetaldehyde generation yet further. Moreover, since the polyester is exposed to high temperature only in post-finishing, color degradation often associated with extended high temperature reaction is reduced. It is desirable that post-finishing time not exceed 30 minutes, preferably not more than 20 minutes.

In one embodiment, germanium is the sole catalyst employed during polycondensation. However, it is also possible to employ co-catalysts, particularly antimony co-catalysts, as well. The amount of co-catalyst, calculated as metal, should not exceed the concentration of the germanium catalyst, is preferably not more than 50 mole % of this amount, and more preferably less than 20 mole %. Most preferably, no antimony and no titanium co-catalysts are employed.

The polyester polymers and the process of the invention is capable of resulting in less than 30%, or 20% or less, or 15% or less, or 12% or less, or 10% or less germanium fed into the polyester manufacturing process volatilizing from the finisher reactor, represented as Ge loss.

Additives, such as phosphorus compounds, for deactivating or stabilizing the polycondensation catalyst, have been used in the manufacture of polyesters. Surprisingly, the polyester polymers of the invention do not require treatment to deactivate (whether partially or fully) the polycondensation catalyst (such as Ge). Known treatments include the addition of additives such as P compounds, or contacting polyester particles with hot water, such as by submersion, at a temperature and for a time to deactivate the catalyst. Advantageously, the process of the invention can be practices in the absence of, and the polyester polymer particles having an It.V. of at least 0.72 dL/g obtained in the melt phase polycondensation are made without the application of, a treatment to deactivate the catalyst.

For example, phosphorus stabilizers are not required in the manufacturing of germanium-catalyzed polyester particles, which have a high enough molecular weight to be useable without solid state polymerization. These particles have low AA generation rates upon melting, without the presence of a phosphorus compound. Thus, an advantage of the subject process is that the addition of phosphorus compounds such as trimethyl phosphate or phosphoric acid is unnecessary. Phosphorus stabilizers add cost to a polyester manufacturing process: both in their price and in their often deleterious impact on polycondensation rate when added during the polycondensation zone, or on intrinsic viscosity when added after or near the end of or after the polycondensation zone, and hot water treatments add cost and slow production time.

Thus, in one embodiment, there is provided a process for making a a polyester polymer particle in the absence of a treatment for deactivating the germanium catalyst, wherein the particles are obtained by polycondensing a polyester melt in the presence of a germanium catalyst to an It.V. of at least 0.72 dL/g. The particles may be finished particles ready to be fed or fed to a machine for converting the pellets into articles such as bottle preforms without treating the polymer to deactivate the germanium catalyst (whether by additive to the melt or hot water treatment of the pellets) prior to feeding the polymer to the machine.

The polyester polymer of the invention desirably have an It.V. of at least 0.72 dL/g, or at least 0.74 dL/g, or at least 0.76 dL/g, or at least 0.78 dL/g, or at least 0.80 dL/g, and up to about 1.2 dL/g, obtained in melt phase polycondensation, and are preferably not solid state polymerized.

The loss of germanium during polycondensation is also dependent, of course, on the time to viscosity and the pressure, as well as the temperature. The longer the polycondensing mixture is exposed to elevated temperature and high vacuum, the greater the loss of Ge. Moreover, the higher the temperature and the lower the pressure, the greater will be the Ge loss. The catalyst loss may be expressed as a percentage of that used in the polycondensation.

Thus, in another embodiment, a polymer melt is polycondensed for less than 5 hours, or less than 3 hours, or from 1.5 hours or less, or 1 hour or less, measured between an It.V. ranging from 0.3 dL/g to 0.7 dL/g, and polycondensation is conducted in a finishing reactor at a temperature setting in the range of 240° C. to 270° C., or 260° C. to 270° C. The vacuum during the polycondensation period in another embodiment ranges from 0.1 torr to 4 torr, or 0.1 torr to 2.5 torr, or 0.2 to 2 torr.

It is surprising, in view of the admonitions of the prior art, that high intrinsic viscosity polymers can be obtained using germanium catalysts in reasonable manufacturing times, without resorting to solid state polymerization, particularly in view of the prior art disclosure that solid state polymerization is necessary in germanium catalyzed systems.

In another embodiment, polyester polymers which are not solid state polymerized can be obtained exhibiting low acetaldehyde generation, even without addition of phosphorus compounds. The residual or free AA in the particles is expected to be low as well An advantage of the subject inventive process is that solid state polymerization may be avoided, thus resulting in considerable cost savings. The polyester polymers obtained by melt phase polymerization have an It.V. of at least 0.70 dL/g, or at least 0.72 dL/g, or at least 0.74 dL/g, or at least 0.76 dL/g, or at least 0.78 dL/g, or at least 0.80 dL/g. However, if desired, additional increase in molecular weight for specific applications may be achieved through solid state polymerization. Often, the time of the additional solid state polymerization can be shortened appreciably due to the higher molecular weight already reached in the finisher, and thus some overall economy can still be achieved. However, when solid state polymerization is not performed, the polyesters also experience a smaller It.V. loss upon melting, relative to solid state polymerized polyesters, due to the absence of core/shell molecular weight gradients in the polyester particles. A further advantage of non-solid state polymerized polyesters of the invention is their is their lower melting point, which results in less energy being required to melt the particles. The lower melting point occurs in the absence of solid-state polymerization or other high temperature conditions which impart a crystal annealing to the polyester particles. In addition, there are fewer constraints on the shape of the polyester particle or pellet because diffusion during solid state polymerization is no longer a consideration.

Separately prepared crystallization aid need not be prepared or employed during the crystallization of the polymers. The reason for not requiring a crystallization aid may be due to the lower polycondensation temperature in the finisher. In one embodiment, the polymers have a degree of crystallinity of at least 25%, or at least 30%, or at least 35%, or at least 40%.

No phosphorus additive is needed to obtain low acetaldehyde (AA) generation and presumably, low residual AA. The cost of the phosphorus additive is saved. In addition, the time in the finisher required to compensate for the subsequent loss in inherent viscosity due to the late addition of a phosphorus compound is no longer needed. This would allow a Ge-catalyzed PET manufacturing process to run at a faster production rate, that is, produce more pounds of polyester per unit time. Also, phosphorus additives have been known to react with polyester catalysts to form species that cause haze in the polyester and/or tend to accumulate in the filters. Metal phosphates are an example of such a species. The absence of phosphorus additives, and hence, metal phosphates, would result in longer filter life, and hence, lower the operating cost for polyester production.

The finished polyester polymer particles may have an average It.V. of at least 0.72 dL/g, or, or 0.74 dL/g, or 0.76 dL/g, obtained in a melt phase polymerization and a residual acetaldehyde level of 10 ppm or less or 5 ppm or less; wherein said particles contain germanium atoms. Preferably, such particles are not solid state polymerized. There is also provided a shipping container comprising such finished particles. Examples of shipping containers are Gaylord boxes, rail cars, trucks, cargo holds on ships, and the like. Preferably, the finished polyester particles also have a degree of crystallinity of at least 20%, preferably at least 30%. By "finished" particles is meant particles that have been subjected by the particle manufacturer to all the processing conditions needed to produce a particle ready for shipping from the manufacturer to a customer for feeding into dryer hoppers associated with a molding machine or directly to a molding machine used for converting particles into articles, without any further processing steps performed by the particle manufacturer (or on behalf of the particle manufacturer). Of course, the converter can apply any number and types of processing steps to the finished polymer, such as combining the finished particles with colorants, UV light inhibitors, oxygen scavenging systems, etc, at the injection molding machine for making articles.

Suitable articles which are formed from the polyester polymer compositions manufactured with the composition of the invention are sheets, bottle preforms, beverage bottle preforms, and blow molded bottles made therefrom.

The acetaldehyde generation f the polyester polymers made by the subject invention is desirably less than 20 ppm, or 15 ppm or less, or 13 ppm or less, or 11 ppm or less, or 10 ppm or less. The acetaldehyde level in the preforms made with the polyesters of the invention have a preform AA of 10 ppm or less, or 8 ppm or less, or 6 ppm or less, or 4 ppm or less.

The acetaldehyde level, generation, and It.V. may be determined by the test methods described below.

The polyesters of the subject application can be compounded with all customary additives, for example toners, pigments (when appropriate), antioxidants, oxygen scavengers, thermal stabilizers, UV stabilizers, etc. The polyesters may likewise be compounded without each of these components individually or as mixtures. When no or little negative impact occurs in polyester properties or manufacturing process, additives can be introducing during the melt-phase polyester manufacturing process. The point of introduction into the manufacturing process depends on the thermal stability of the additive, its physical form, where it is most effective, and mixing efficiencies.

Having generally described this invention, a further understanding can be obtained by reference to certain specific examples which are provided herein for purposes of illustration only and are not intended to be limiting unless otherwise specified.

EXAMPLES

Example 1

The free AA can be measured on solid particles or preforms. The method used to determine the level of free AA in the polyester polymer composition is the test method ASTM #F2013-00. This test method is used to measure the level of free acetaldehyde in particles, powders, preforms, bottles, and any other form the polyester polymer composition may take. For purposes of measuring residual or free acetaldehyde, the sample is tested according to the method described below.

If this test is done on polyester powders, the following protocol should be followed. The polymer disk should be placed in liquid nitrogen as soon after pulling as it is safe to handle (about 12 minutes). The polymer should be kept cool until tested as AA is volatile. This includes cryogenically grinding the polymer, storage in a freezer whenever the powder is not in use, and delivering to the testing lab on dry ice. Although AA will diffuse more slowly out of pellets and preforms than out of a fine powder, long times, especially at elevated temperatures, can result in low residual AA numbers, even though that may not have been the case originally.

The test procedure for measuring the level of free acetaldehyde on a sample, whether a preform, pellet, powder, or other form is the ASTM # F2013-00 test method. Samples are cryogenically ground through a Wiley Mill equipped with a 1.0 mesh screen. The final ground material has a particle size less than 800 µm. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated. The amount of acetaldehyde calculated represents the amount of free or residual acetaldehyde present in the sample.

For measuring the acetaldehyde generation rate on preforms, it is sufficient to use this ASTM #F2013-00 Method as described above without subjecting the preforms to a further melt history since by virtue of making a preform, the pellets are melted in an extruder prior to injection molding. By melt extruding or injection molding, AA precursors in the polymer melt have the opportunity to convert to acetaldehyde.

The acetaldehyde generation rate can be measured on the solid particles. However, for purposes of measuring the acetaldehyde generation, the sample has to undergo a second melt history in order to determine the level of acetaldehyde generated. If the sample is a particle or powder which has not undergone a melt step in addition to a prior melt phase polycondensation step, the sample is first treated according to the Sample Preparation procedure described below, after which the sample is submitted to the ASTM #F2013-00 test method for analysis.

Sample Preparation: For the purpose of measuring the acetaldehyde generation rate, and if the sample manufactured exclusively in the melt phase has not seen a melt history subsequent to melt phase polycondensation, it is prepared according to this method prior to submitting the sample to the ASTM #F2013-00 test. Samples of polymer powder ground to pass a 3 mm screen are heated in an oven at 115° C. under vacuum (25-30 in. Hg) with a 4 SCFH nitrogen purge for at least 48 h. Although overnight drying would be sufficient for water removal alone, which is all that is needed for solid-stated samples, this extended oven treatment also serves to desorb to about 1 ppm or less the residual AA present in the high IV powder after melt-phase-only synthesis and prior to AA generation testing. It would take longer to desorb residual AA from pellets to about 1 ppm or less, due to the larger particle size (longer diffusion path). Any suitable acetaldehyde devolatization technique can be employed on pellets which reduces the level of free acetaldehyde down to about 1 ppm or less, including passing hot inert gas over the pellets for a time period sufficient to reduce the residual acetaldehyde to the desired level. The acetaldehyde devolatization temperature should not exceed 170° C. The sample is then packed in a preheated Tinius Olsen extrusion plastometer using a steel rod. The orifice die is calibrated according to ASTM D 1238. A small amount of material is purged out the bottom, which is then plugged. The piston rod assembly is put in the top of the barrel. A 225 g weight may be placed on top of the piston rod to hold the rod down inside of the barrel. The polymer is held at 295° C. for 5 min. The orifice plug is then removed from the bottom of the barrel. Via a large weight and operator pressure, the extrudate is pushed out of the barrel into an ice water bath. The extrudate is patted dry, sealed in a bag and placed in a freezer until the ASTM #F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample is collected, patted dry, sealed in a bag and placed in a freezer until the ASTM # F2013-00 test is performed.

Acetaldehyde can be generated in polyester resins with the Ceast Model 7027 Modular Melt Flow or any similar extrusion plastometer instrument. The automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but loading of the polymer is not automated.

Acetaldehyde can be generated in the above manner over a temperature range of 265° C. to 305° C. The most consistent results are obtained between 275° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process, making it ideal for testing laboratory samples.

Other polymer parameters may be measured by standard methods. PET samples containing antimony or germanium and/or phosphorus were tested for element level by x-ray fluorescence ("XRF").

Color values are measured on polyester polymers ground to a powder passing a 3 mm screen. Color measurements were performed in reflectance (specular included) using a Hunter-Lab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer is standardized regularly and UV control was employed and maintained in calibration following the HunterLab recommendations. An optional glass port plate is installed at the reflectance port to minimize contamination of the sphere. Powders are placed in an optical glass cell. The cell is metallic gray, except for the glass front. The optical-grade glass is recessed from the front of the cell by 0.062" and the glass itself is 0.092" thick. The sample area is 0.71" deep, 1.92" wide, 2.35" tall.

The powders are allowed to settle by vibrating the sample for 20 seconds using a laboratory Mini-Vortexer (VWR International, West Chester, Pa.). The glass cell is maintained flush against the reflectance port and covered with a black opaque cover. A single cell packing is evaluated and the cell is removed and replaced for three replicate measurements for each sample. The reported value should be the average of the triplicates.

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL.

The viscosity of the polymer solutions is determined using a Viscotek Modified Differential Viscometer. A description of the operating principle of the differential viscometers can be found in ASTM D 5225. The inherent viscosity is calculated from the measured solution viscosity. The following equations describe such solution viscosity measurements and subsequent calculations to Ih.V. and from Ih.V. to It.V:

The solution viscosity relates to the composition and molecular weight of a polyester. The following equations describe the solution viscosity measurements and subsequent calculations as performed for PET.

The uncorrected inherent viscosity ($\eta_{inh}$) of each sample is calculated from the Viscotek Model Y501 Relative Viscometer using the following equation:

$$\eta_{inh} = [\ln(P_2/KP_1)]/C$$

where
$P_2$=The pressure in capillary $P_2$
$P_1$=The pressure in capillary $P_1$
ln=Natural logarithm
K=Viscosity constant obtained from baseline reading
C=Concentration of polymer in grams per 100 mL of solvent The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} \ln(\eta_r/C)$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves triplicate testing of a standard reference material and then applying appropriate mathematical equations to produce the "accepted" values.

The three values used for calibration shall be within a range of 0.010; if not, correct problems and repeat testing of standard until three consecutive results within this range are obtained.

Calibration Factor=Accepted I.V. of Reference Material/Average of Triplicate Determinations Corrected IhV=Calculated IhV×Calibration Factor The intrinsic viscosity (ItV or $_{int}$) may be estimated using the Billmeyer equation as follows:

$_{\eta_{int}} = 0.5[e^{0.5 \times \text{Corrected } IhV} - 1] + (0.75 \times \text{Corrected } IhV)$ The reference for estimating intrinsic viscosity (Billmeyer relationship) is J. Polymer Sci., 4, pp. 83-86 (1949).

Alternatively, the It.V. can be measured using the above solvents and concentrations with a Rheotek Glass Capillary viscometer. A description of the operating principle of this viscometer can be found in ASTM D 4603.

The uncorrected inherent viscosity ($\eta_{inh}$) is calculated using the following equation:

$\eta_{inh} = [\ln(t_s/t_o)]/C$ where
$\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

A sample of PET oligomer (partially polycondensed) prepared from terephthalic acid and ethylene glycol, and also containing about 1.5 mole percent of about 35% cis/65% trans 1,4-cyclohexanedimethanol was employed in the polycondensation. The oligomer also contains about 1.2 weight percent of diethylene glycol, which was generated during esterification. This oligomer has about 95% conversion via proton NMR and titration for carboxyl end groups (500.2 Meq/kg), a $M_n$ of about 766 g/mole, and a $M_w$ of 1478 g/mole.

Amorphous germanium (IV) oxide was purchased from Aldrich. Millipore filtered water was added to a bottle containing amorphous germanium (IV) oxide (0.440 g) until the weight of the germanium (IV) oxide and the water reached a total of 62.531 g. The solution was calculated to be 0.4885 wt./wt. % Ge. The mixture was stirred until dissolved. In time, another solution was made by adding Millipore filtered water to a bottle containing amorphous germanium (IV) oxide (0.466 g) until the weight of the germanium (IV) oxide and the water reached a total of 66.086 g. The catalyst mix container was placed in a sonicator with about 50 deg C water for 15 minutes, and catalyst mix became clear. The solution was calculated to be 0.4895 wt./wt. % Ge.

For polycondensation, ground oligomer (103 g) is weighed into a half-liter, single-necked, round-bottomed flask. The aqueous solution of amorphous germanium (IV) oxide was added to the oligomer in an amount appropriate to approach the target in the polyester. The target was adjusted up based on background work to determine % Ge losses. A 316 L stainless steel paddle stirrer and glass polymer head were attached to the flask. After attaching the polymer head to a side arm and a purge hose, two nitrogen purges are completed. The polymerization reactor is operated under control of a CAMILE™ automation system, programmed to implement the following array (Table 1). Two experimental apparatuses are employed, but the results are believed to be comparable when the pressure, temperature and other variables are the same.

TABLE 1

| Stage | Time (minutes) | Temperature ° C. | Vacuum (torr) | Stir Speed (rpm) | Power (kg-cm) | Flags |
|---|---|---|---|---|---|---|
| 1 | 0.1 | 270 | 730 | 0 | | |
| 2 | 10 | 270 | 730 | 150* | | |
| 3 | 2 | 270 | 140 | 300* | | |
| 4 | 1 | 270 | 140 | 300 | | Calibrate |
| 5 | 10 | 270 | 25* | 300 | | |
| 6 | 10 | 270 | 25 | 300 | | |
| 7 | 1 | 270 | 140* | 300 | | |
| 8 | 2 | 270 | 140 | 300 | | Catalyst(P) |
| 9 | 1 | 270 | 25* | 300 | | |
| 10 | 10 | 270 | 25 | 300 | | |
| 11 | 2 | 270 | 2* | 30* | | |
| 12 | 1 | 270 | 0.2* | 30 | | Vacuum |
| 13 | 500# | 270 | 0.2 | 30 | target | Power |

*= ramp;
= torque termination
when Temperature in Table 1 = 300° C., change all 270 to 300 (same for 285).
When Finisher Vacuum in Table 2 = 2 torr, change 0.2 in stages 12 & 13 to 2 (same for 1.1)

A molten bath of Belmont metal is raised to surround the flask, and the CAMILE™ array is implemented. In this array, a "ramp" is defined as a linear change of vacuum, temperature, or stir speed during the specified stage time. The background torque is determined between stages 4 and 5. A correction is made for the background torque present prior to significant molecular weight build-up. After stage 6 ends, the vacuum level was ramped up to 140 torr, and then a 2 minute phosphorus addition stage (stage 8) begins. The finisher stage (13) is terminated when the corrected stirrer torque reaches the target (predetermined for a given temperature and polymer rig) three times. The polymer is cooled to ambient temperature.

The polymers are chopped and ground to pass a 3 mm screen. The ground polymer is analyzed for acetaldehyde generation rate (AAGen), inherent viscosity, L*, a*, and b* color.

The Examples and Comparative Examples polycondensation parameters are summarized in Table 2 below. The Examples marked "Ref" are reference examples employing a standard antimony catalyst, about 210 ppm Sb and 16 ppm P, for comparison purposes and are comparative examples. Antimony (III) glycolate in ethylene glycol was filtered through a 0.45 micron filter and was found by XRF to be 0.82 wt./wt. % Sb. The phosphorus solution was made by mixing thoroughly 26.38 grams of oligomeric phosphate triester, 50.08 grams of n-butanol and 181.5 g of EG. The solution was found by XRF to be 1.02 wt./wt. % P. Examples preceded by a "C" are, like the Ref examples, comparative examples except that the examples preceded by a C contain Ge as the catalyst.

| Example | Ge Target (ppm) | Adjusted Ge Target (ppm) | Temp. (deg. C.) | Finisher Vacuum (torr) | Finisher Time to IV (min) | IhV dL/g | Ge by XRF (ppm) | Ge Loss (%) | AA Gen 295/5 (ppm) | L* Color (CIELAB) | a* Color (CIELAB) | b* Color (CIELAB) |
|---|---|---|---|---|---|---|---|---|---|---|---|---|
| Ref 1 | | | 285 | 1.1 | 85.80 | 0.761 | | | 30.52 | 79.77 | −1.15 | 3.88 |
| Ref 2 | | | 285 | 1.1 | 89.45 | 0.785 | | | 27.05 | 77.99 | −1.26 | 2.84 |
| Ref 3 | | | 285 | 1.1 | 72.40 | 0.727 | | 0 | 28.87 | 78.23 | −0.91 | 3.71 |
| Ref 4 | | | 285 | 1.1 | 84.92 | 0.786 | | 0 | 26.3 | 80.03 | −0.66 | 6.61 |
| C1 | 75 | 94.15 | 290 | 0.2 | 72.02 | 0.811 | 63.49 | 32.6 | 16.02 | 81.84 | 0.09 | 8.87 |
| 1 | 75 | 94.34 | 270 | 0.2 | 156.47 | 0.777 | 89 | 5.7 | 7.92 | 78.53 | 0.36 | 7.75 |
| C2 | 75 | 94.15 | 290 | 2 | 89.97 | 0.75 | 62.22 | 33.9 | 21.995 | 82.23 | 0.09 | 9.34 |
| 2 | 75 | 94.15 | 270 | 2 | 360.22 | 0.772 | 74.54 | 20.8 | 14.98 | 77.01 | 0.26 | 8.73 |
| C3 | 225 | 268.19 | 300 | 0.2 | 40.12 | 0.806 | 217 | 19.1 | 18.62 | 81.46 | −0.12 | 9.61 |
| 3 | 225 | 268.19 | 270 | 0.2 | 123.98 | 0.765 | 269 | −0.3 | 10.4 | 80.36 | −0.08 | 6.65 |
| C4 | 225 | 268.19 | 300 | 2 | 42.87 | 0.789 | 186.4 | 30.5 | 24.81 | 81.30 | 0.06 | 9.09 |
| 4 | 225 | 268.19 | 270 | 2 | 233.82 | 0.784 | 244.3 | 8.9 | 15.845 | 82.70 | 0.12 | 8.66 |
| 5 | 150 | 197.7 | 285 | 1.1 | 62.78 | 0.787 | 136.73 | 30.8 | 12.325 | 82.04 | 0.14 | 8.23 |
| 6 | 150 | 197.70 | 285 | 1.1 | 63.32 | 0.789 | 136.67 | 30.9 | 14.585 | 81.54 | 0.15 | 7.49 |
| 7 | 150 | 198.10 | 285 | 1.1 | 74.00 | 0.776 | 150 | 24.1 | 11.74 | 83.06 | −0.09 | 8.27 |
| 8 | 150 | 197.70 | 285 | 1.1 | 89.00 | 0.796 | 151.52 | 23.4 | 18.04 | 81.53 | 0.19 | 7.85 |
| 9 | 150 | 198.10 | 285 | 1.1 | 75.08 | 0.806 | 141 | 28.7 | 14.32 | 82.56 | 0.04 | 7.59 |

Examples 1 and 2 were run on different but comparable experimental apparatuses, and there was a difference in the vacuum used during the finisher stage.

Comparative Example 1, containing about 75 ppm Ge catalyst and run at a pressure of 0.2 torr, resulted in a Ge loss of about 32%. At similar or the same quantities of Ge catalyst and at the same finisher pressure of 0.2 torr, Example 1, run at a lower temperature of 270° C., indicated an improvement in the Ge loss coming in at about 5.7% loss. This was the case even though the finisher residence time of Example 1 was longer than the residence time in Comparative Example 1.

Comparative Example 2, also using about 75 ppm Ge catalyst, was conducted at a finisher pressure of 2 torr, resulting in a Ge loss of about 34%. Example 2, run at similar or the same catalyst levels and finisher pressure, but conducted at a lower temperature of only 270° C., resulted in a Ge loss of about 21%, improved over the Ge loss of Comparative Example 2. It can also be seen that conducting the polycondensation reaction at a lower pressure of 0.2 torr as in Example 1 will further improve the Ge losses.

It is desirable to lose as little germanium catalyst as possible. In a production process for manufacturing polyester, having less germanium catalyst lost means less germanium catalyst that will have to be recycled, and hence, a more economical process.

Comparative Example 3 illustrates a polyester made with higher amounts of catalyst than in the preceding examples, about 225 ppm, at a finisher pressure of 0.2 torr, resulting in a Ge loss of about 19%. On the other hand, Example 3, made with similar or the same amount of Ge catalyst at the same finisher pressure, resulted in a polyester polymer having virtually no loss. Moreover, the AA generation rate was also improved.

Comparative Example 4 illustrates a polyester made with about 225 ppm at a finisher pressure of 2 torr, resulting in a Ge loss of about 30.5%. On the other hand, Example 4, made with similar or the same amount of Ge catalyst at the same finisher pressure, resulted in a polyester polymer having virtually no loss. Moreover, the AA generation rate was also improved.

C6-C8 examples illustrate the results of polyesters made with an intermediate Ge level, temperature & vacuum.

The acetaldehyde generation figures in the examples are particularly surprising. Polycondensations performed in the presence of a Ge catalyst did not have any phosphorus compound present, and yet some of the AA generation numbers were very low. This ability appears to be unique to Ge catalysts: the ability to produce high IV, melt-phase only EG-containing polyesters without a catalyst deactivator added that generate small amounts of acetaldehyde upon melting. Eliminating the necessity of adding a phosphorus compound lowers cost in terms of not purchasing the phosphorus compound, and also in terms of the IV that has to be built, that is the IV built would not have to exceed the target IV as it does with phosphorus addition, due to the IV loss induced by the late addition of certain phosphorus compounds, like phosphoric acid.

All the polycondensations which took place at 270° C. were much lower in acetaldehyde generation than those performed at higher temperatures under similar vacuum and catalyst level conditions, and considerably lower than the antimony catalyzed reference polymer. In each case, also, a higher vacuum led to polymers with lower acetaldehyde generation. Best results in terms of low AA generation rates and low loss of Ge were obtained when the temperature was kept low, e.g. 270° C., and the pressure was also kept low, e.g. 0.2 torr, The following examples use the same oligomer described previously. The polycondensation conditions listed in Table 1 are used for the most part, except the vacuum in stages 12 & 13 was 0.5 torr. For Example 77, antimony (III) glycolate in ethylene glycol was filtered through a 0.45 micron filter and was found by XRF to be 0.79 wt./wt. % Sb. For the Example 6, the oligomeric phosphate triester solution described previously was added during Stage 8.

Example 15 had late addition of a phosphoric acid solution (112 ppm Ge/106 ppm P), and the array in Table 3 was used. This array is time terminated (not terminated based on torque). The finisher time in Stage 9 (141 minutes) comes from an earlier torque terminated run (Example 13). The phosphoric acid solution was made by weighing out 5.4338 g of 85% phosphoric acid and 44.57 g of ultra pure water, and stirring magnetically. By XRF, the solution was 2.9 wt./wt. %

P. The phosphoric acid solution was added in Stage 11 of the array in Table 3. The germanium solution was made by weighing out 0.8768 amorphous germanium dioxide (IV) oxide from Aldrich and 125.04 g of water, and sonicating at 57° C. until clear. The solution was calculated to be 0.487 wt./wt. % Ge.

The results are shown in Table 4.

TABLE 3

| Stage | Time (minutes) | Temperature ° C. | Vacuum (torr) | Stir Speed (rpm) | Power (kg-cm) | Flags |
|---|---|---|---|---|---|---|
| 1 | 0.1 | 270 | 730 | 0 | | |
| 2 | 10 | 270 | 730 | 150* | | |
| 3 | 2 | 270 | 140 | 300* | | |
| 4 | 1 | 270 | 140 | 300 | | Calibrate |
| 5 | 10 | 270 | 25* | 300 | | |
| 6 | 20 | 270 | 25 | 300 | | |
| 7 | 2 | 270 | 2* | 30* | | |
| 8 | 1 | 270 | 0.5* | 30 | | Vacuum |
| 9 | 141 | 270 | 0.5 | 30 | | |
| 10 | 3 | 270 | 650 | 30 | | |
| 11 | 2 | 270 | 650 | 30 | | Catalyst Deactivator |
| 12 | 1 | 270 | 650 | 100 | | |
| 13 | 5 | 270 | 650 | 100 | | |

*= ramp

TABLE 4

| Example | Ge Target (ppm) | Adj Ge Target (ppm) | Temperature (deg C.) | Finisher Vacuum (torr) | Time to IV (min) | IV (dL/g) | XRF Sb (ppm) | XRF P (ppm) | XRF Ge (ppm) | Ge Loss (%) | L* (CIELAB) | a* (CIELAB) | b* (CIELAB) | AA Gen @ 295 C./ 5 min (ppm) |
|---|---|---|---|---|---|---|---|---|---|---|---|---|---|---|
| 10 | 100 | 125 | 270 | 0.5 | 204.98 | 0.772 | | 14 | 73 | 41.6 | 85.19 | −0.65 | 7.81 | 10.07 |
| 11 | 100 | 125 | 270 | 0.5 | 141.19 | 0.735 | | | 101 | 19.2 | 83.57 | −0.44 | 7.45 | 8.5 |
| 12 | 100 | 125 | 270 | 0.5 | | 0.493 | | 106 | 112 | 10.4 | 86.32 | −0.54 | 6.96 | 9.115 |
| 13 | | | 270 | 0.5 | 183.55 | 0.844 | 212 | | | | 80.22 | −0.79 | 6.21 | 27.14 |
| 14 | 100 | 125 | 270 | 0.5 | 135.84 | 0.769 | | | 99 | 20.8 | 80.38 | −0.97 | 5.84 | 10.425 |

In the absence of a phosphorus compound, the 100 ppm Ge case has much lower AA generated than the 210 ppm Sb case. Adding an a small amount of oligomeric phosphate triester during the polymerization, Example 10, appears to have slowed the polycondensation rate and increased the percentage of Ge lost, relative to Examples 11 & 14. T In Example 12, the addition of a sizable amount of relatively dilute phosphoric acid solution late caused a large break in IV With a more concentrated phosphoric acid solution (as close to neat as possible, that is, as little of water or solvent as possible), less IV break is expected. Late addition of a catalyst deactivator can result in a faster polycondensation rate, relative to early addition of a catalyst deactivator. Also, late addition of a catalyst deactivator can result in decreased color and/or decreased amount of AA generated upon melting, relative to the analogous case with no deactivator added. In the case of a germanium catalyst, low amounts of AA were generated without a phosphorus compound present, per Examples 11 & 14

Overall, examples 10-14 illustrate that low loss of Ge can be obtained even in the absence of P stabilizers, and further than low AA generation rates can also be obtained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for making polyester polymer particles without solid state polymerization, comprising polycondensing a polyester polymer in the form of a melt in a finisher reactor, in the presence of a germanium catalyst, at a polymer temperature which substantially remains below 285° C. for at least 95% of the residence time of said polycondensing in the finisher reactor, until an intrinsic viscosity of at least 0.72 dL/g is reached, wherein the polyester polymer comprises a carboxylic acid component comprising at least 92 mole % residues of terephthalic acid, and a hydroxyl component comprising at least 92 mole % residues of ethylene glycol, based on there being 100 mole percent carboxylic acid component residues and 100 mole percent hydroxyl component residues in the polyester polymer, and wherein no phosphorus compounds are added to the polyester polymer in the form of a melt prior to obtaining an It.V. of 0.72 dL/g, and the polyester polymer particles are not treated with water to deactivate the germanium catalyst.

2. The process of claim 1, wherein the polycondensing is continued until an intrinsic viscosity of at least 0.76 dL/g is reached.

3. The process of claim 1, wherein the polycondensing is continued until an intrinsic viscosity of at least 0.80 dL/g is reached.

4. The process of claim 1, wherein the polymer temperature setting of the finishing reactor is 280° C. or less.

5. The process of claim 1, wherein the polymer temperature 275° C. or less.

6. The process of claim 1, wherein the polymer temperature is 273° C. or less.

7. The process of claim 1, wherein the polymer temperature 270° C. or less.

8. The process of any one of claims 1-7, wherein the minimum temperature of the polymer is at least 250° C.

9. The process of any one of claim 1-7, wherein the polycondensing in the finisher reactor is conducted at a pressure of 1 torr or less.

10. The process of any one of claims 1-7, wherein the polycondensing in the finisher reactor is conducted at a pressure of 2 torr or less.

11. The process of claim 1, wherein the concentration of germanium ranges from 20 ppm to 250 ppm germanium atoms, based on the weight of the polyester polymer particles made.

12. The process of claim 11, wherein said concentration of germanium is between 50 and 150 ppm.

13. The process of claim 1, wherein less than 30% of germanium fed into the process is volatilized from the finisher reactor.

14. The process of claim 1, wherein 15% or less of germanium fed into the process is volatilized from the finisher reactor.

15. The process of claim 1, wherein the polyester polymer particles have an amount of acetaldehyde generated upon melting of less than 15 ppm.

16. The process of claim 5, wherein the polyester polymer particles have an amount of acetaldehyde generated upon melting of 10 ppm or less.

17. The process of claim 1, wherein said polyester polymer particles are crystallized, and no crystallizing aid is added to the polyester polymer in the form of a melt in the finisher reactor or to the polyester polymer particles prior to crystallization.

18. The process of claim 1, wherein the polyester polymer particles are not treated to deactivate the germanium catalyst.

19. The process of claim 18, wherein the polyester polymer particles are contained in a shipping container, and the polyester polymer particles in the shipping container are not solid state polymerized.

20. The process of claim 18, wherein the polymer temperature is between 260° C. and 275° C. during the polycondensing, and wherein the polycondensing in the finisher reactor is conducted at a pressure below 1 torr.

21. The process of claim 20, wherein the pressure in the finisher reactor is 0.8 torr or less.

22. The process of claim 20, wherein the time required to reach an intrinsic viscosity of 0.72 dL/g from 0.30 dL/g is less than three hours.

23. The process of claim 20, wherein the time required to reach an intrinsic viscosity of 0.72 dL/g from 0.40 dL/g is less than three hours.

24. The process of claim 1, wherein the intrinsic viscosity of the polyester polymer obtained from the process is between 0.72 and 1.1 dL/g.

25. The process of claim 1, further comprising recovering a part of the volatile germanium catalyst from a germanium containing vapor phase, and recycling a portion or all of the recovered germanium back to a zone for polycondensing a polyester melt.

26. The process of claim 25, further comprising removing a part of the germanium catalyst from the polyester late in the melt-phase manufacturing process by subjecting the polymer melt to a temperature higher than 275° C. and a pressure below 4 torr, and recycling a portion or all of the removed germanium back to a zone for polycondensing a polyester melt.

27. The process of claim 25, wherein the temperature is between 290° C. and 305°C.

28. The process of claim 1, wherein the polymer melt is polycondensed for 3 hours or less measured between an It.V. of 0.3 dL/g and It.V. of 0.72 dL/g.

29. The process of claim 28, wherein the polymer melt is polycondensed for 1.5 hours or less.

30. The process of claim 28, wherein the polymer temperature ranges from 260° C. to less than 275° C.

31. The process of claim 30, wherein vacuum applied to the finisher reactor ranges from 0.1 to 2.5 torr.

32. The process of claim 30, wherein the polyester polymer particles are not solid state polymerized.

33. The process of claim 32, wherein the It.V. of the polyester polymer is at least 0.74 dL/g.

34. The process of claim 33, wherein the degree of crystallinity of the polyester polymer particles is at least 30%.

35. The process of claim 34, wherein the residual acetaldehyde of the polyester polymer particles is 5 ppm or less.

36. The process of claim 35, wherein the acetaldehyde generation of the polyester polymer particles is 13 ppm or less.

\* \* \* \* \*

UNITED STATES PATENT AND TRADEMARK OFFICE
CERTIFICATE OF CORRECTION

PATENT NO.        : 7,579,428 B2
APPLICATION NO.   : 11/890949
DATED             : August 25, 2009
INVENTOR(S)       : Jernigan It is certified that error appears in the above-identified patent and that said Letters Patent is hereby corrected as shown below:

Column 20, Claim 4, Line 47 "setting of the finishing reactor" should be deleted from the claim.

Signed and Sealed this

Ninth Day of November, 2010

David J. Kappos
*Director of the United States Patent and Trademark Office*